United States Patent
Paltashev et al.

(10) Patent No.: US 7,202,872 B2
(45) Date of Patent: Apr. 10, 2007

(54) APPARATUS FOR COMPRESSING DATA IN A BIT STREAM OR BIT PATTERN

(75) Inventors: Timour Paltashev, Fremont, CA (US); Boris Prokopenko, Milpitas, CA (US)

(73) Assignee: VIA Technologies, Inc., Taipei (TW)

( * ) Notice: Subject to any disclaimer, the term of this patent is extended or adjusted under 35 U.S.C. 154(b) by 149 days.

(21) Appl. No.: 10/827,166

(22) Filed: Apr. 19, 2004

(65) Prior Publication Data
US 2005/0093873 A1  May 5, 2005

Related U.S. Application Data

(60) Provisional application No. 60/515,841, filed on Oct. 29, 2003.

(51) Int. Cl.
*G06T 9/00* (2006.01)
*G09G 5/37* (2006.01)
*G09G 5/00* (2006.01)

(52) U.S. Cl. .................. 345/555; 345/561; 345/563; 345/626

(58) Field of Classification Search ............ 345/563, 345/555, 626, 422; 382/166; 708/209, 203; 712/224
See application file for complete search history.

(56) References Cited

U.S. PATENT DOCUMENTS

| | | | |
|---|---|---|---|
| 4,747,154 A | | 5/1988 | Suzuki et al. |
| 5,430,464 A | * | 7/1995 | Lumelsky .................. 345/563 |
| 5,471,628 A | | 11/1995 | Phillips et al. ............. 395/800 |
| 6,006,244 A | * | 12/1999 | Mahurin .................... 708/209 |
| 6,381,690 B1 | | 4/2002 | Lee ............................ 712/223 |
| 6,438,676 B1 | * | 8/2002 | Sijstermans ................ 712/22 |
| 6,636,226 B2 | * | 10/2003 | Morein et al. ............. 345/555 |

FOREIGN PATENT DOCUMENTS

EP   0 803 798   10/1997

OTHER PUBLICATIONS

Chinese Language Office Action, Jan. 29, 2006, China.

* cited by examiner

*Primary Examiner*—Kee Tung
*Assistant Examiner*—Hau Nguyen
(74) *Attorney, Agent, or Firm*—Thomas, Kayden, Horstemeyer & Risley

(57) ABSTRACT

One embodiment of the present invention is directed to a graphics system comprising logic for generating a mask that identifies bits within a plurality of bits that are not to be impacted by a subsequent computation. The graphics system further comprises compression logic that is responsive to the mask for generating a compressed bit stream, such that the bits that are not to be impacted by the computation are not included in the compressed bit stream. Another embodiment of the present invention is directed to a graphics system comprising logic for generating a mask identifying positions within a plurality of positions of a bit stream that are to be removed during a compression operation. The graphic system further comprises logic responsive to the mask for generating a compressed bit stream, such that the positions that are to be removed are removed by variably shifting contents of successive positions by an appropriate amount, so as to overwrite contents of the positions that are to be removed (or previously shifted).

17 Claims, 14 Drawing Sheets

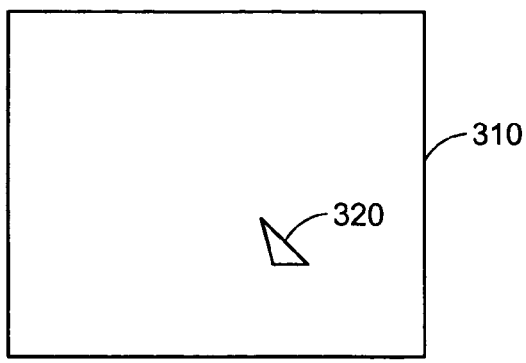
FIG. 6A
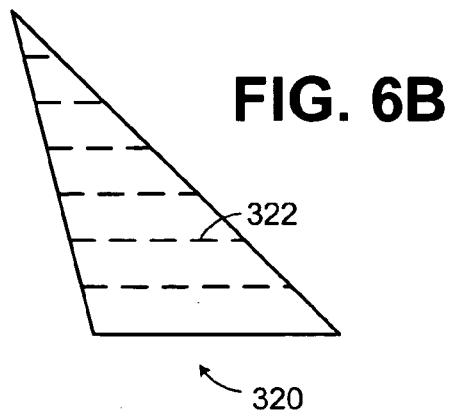
FIG. 6B
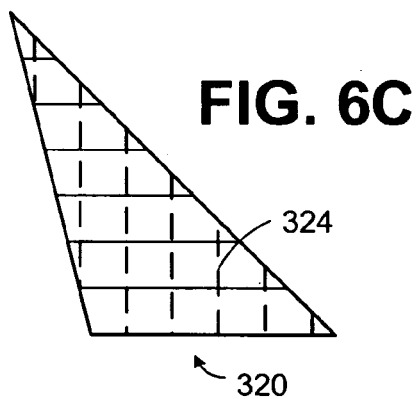
FIG. 6C
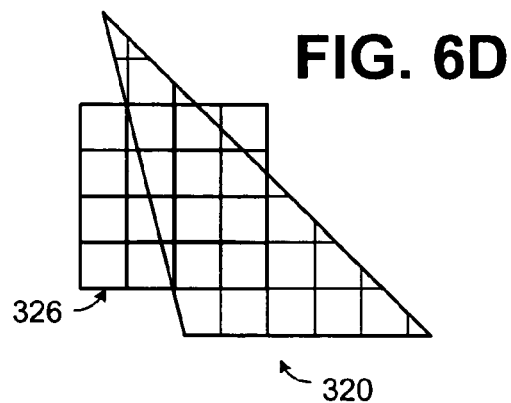
FIG. 6D
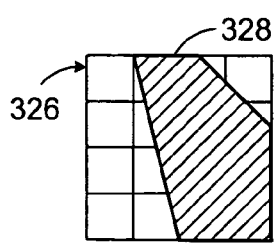
FIG. 6E
| 0 | 1 | 1 | 0 |
|---|---|---|---|
| 0 | 1 | 1 | 1 |
| 0 | 0 | 1 | 1 |
| 0 | 0 | 1 | 1 |
← 330
FIG. 6F

APPARATUS FOR COMPRESSING DATA IN A BIT STREAM OR BIT PATTERN

CROSS-REFERENCE TO RELATED APPLICATION

The present invention claims the benefit of U.S. provisional application Ser. No. 60/515,841, filed Oct. 29, 2003, and entitled "System And Method For Providing Variable Length Compression Between Successive Bit Positions In A Bit Stream Or Bit Pattern." This provisional application is hereby incorporated by reference in its entirety.

FIELD OF THE INVENTION

The present invention generally relates to graphics systems, and more particularly to an apparatus for compressing data in a bit stream or bit pattern.

BACKGROUND

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (x, y, z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadralaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixel positions are covered by the polygon and attempts to write the associated color values and depth (Z value) into frame buffer. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display a scan line at a time in raster order.

With this general background provided, reference is now made to FIG. 1, which shows a functional flow diagram of certain components within a graphics pipeline in a computer graphics system. It will be appreciated that components within graphics pipelines may vary from system, and may also be illustrated in a variety of ways. As is known, a host computer 10 (or a graphics API running on a host computer) may generate a command list 12, which comprises a series of graphics commands and data for rendering an "environment" on a graphics display. Components within the graphics pipeline may operate on the data and commands within the command list 12 to render a screen in a graphics display.

In this regard, a parser 14 may retrieve data from the command list 12 and "parse" through the data to interpret commands and pass data defining graphics primitives along (or into) the graphics pipeline. In this regard, graphics primitives may be defined by location data (e.g., x, y, z, and w coordinates) as well as lighting and texture information. All of this information, for each primitive, may be retrieved by the parser 14 from the command list 12, and passed to a vertex shader 16. As is known, the vertex shader 16 may perform various transformations on the graphics data received from the command list. In this regard, the data may be transformed from World coordinates into Model View coordinates, into Projection coordinates, and ultimately into Screen coordinates. The functional processing performed by the vertex shader 16 is known and need not be described further herein. Thereafter, the graphics data may be passed onto rasterizer 18, which operates as summarized above.

Thereafter, a z-test 20 is performed on each pixel within the primitive being operated upon. As is known, this z-test is performed by comparing a current z-value (i.e., a z-value for a given pixel of the current primitive) in comparison with a stored z-value for the corresponding pixel location. The stored z-value provides the depth value for a previously-rendered primitive for a given pixel location. If the current z-value indicates a depth that is closer to the viewer's eye than the stored z-value, then the current z-value will replace the stored z-value and the current graphic information (i.e., color) will replace the color information in the corresponding frame buffer pixel location (as determined by the pixel shader 22). If the current z-value is not closer to the current viewpoint than the stored z-value, then neither the frame buffer nor z-buffer contents need to be replaced, as a previously rendered pixel will be deemed to be in front of the current pixel.

Again, for pixels within primitives that are rendered and determined to be closer to the viewpoint than previously-stored pixels, information relating to the primitive is passed on to the pixel shader 22 which determines color information for each of the pixels within the primitive that are determined to be closer to the current viewpoint. Once color information is computed by the pixel shader 22, the information is stored within the frame buffer 24.

Although the foregoing has only briefly summarized the operation of the various processing components, persons skilled in the art recognize that the processing on graphics data is quite intense. Consequently, it is desired to improve processing efficiency wherever possible.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

One embodiment of the present invention is directed to a logic structure that provides variable-length compression of signals or bits provided at an input. The embodiment comprises a plurality of rows of multiplexers, wherein a first row of multiplexers has inputs connected to the signals associated with data to be compressed (or representative of data positions to be compressed). Subsequent rows of multiplexers have inputs that are connected to outputs of multiplexers in the preceding row. Select lines for the multiplexers are controlled so that data associated with the signals provided at the inputs of the first row of multiplexers may be compressed.

Another embodiment of the present invention is directed to a graphics system comprising logic for generating a mask that identifies bits within a plurality of bits that are not to be impacted by a subsequent computation. The graphics system further comprises compression logic that is responsive to the mask for generating a compressed bit stream, such that the bits that are not to be impacted by the computation are not included in the compressed bit stream.

Yet another embodiment of the present invention is directed to a graphics system comprising logic for generating a mask identifying positions within a plurality of positions of a bit stream that are to be removed during a compression operation. The graphic system further comprises logic responsive to the mask for generating a compressed bit stream, such that the positions that are to be removed are removed by variably shifting contents of successive positions by an appropriate amount, so as to overwrite contents of the positions that are to be removed (or previously shifted).

Other embodiments and variations of the invention will be described in the detailed description that follows.

DESCRIPTION OF THE DRAWINGS

The accompanying drawings incorporated in and forming a part of the specification illustrate several aspects of the present invention, and together with the description serve to explain the principles of the invention. In the drawings:

FIGS. 6A–6F illustrate steps of one embodiment for generating a mask that may be used in embodiments in the present invention.

DETAILED DESCRIPTION

Figure 1:
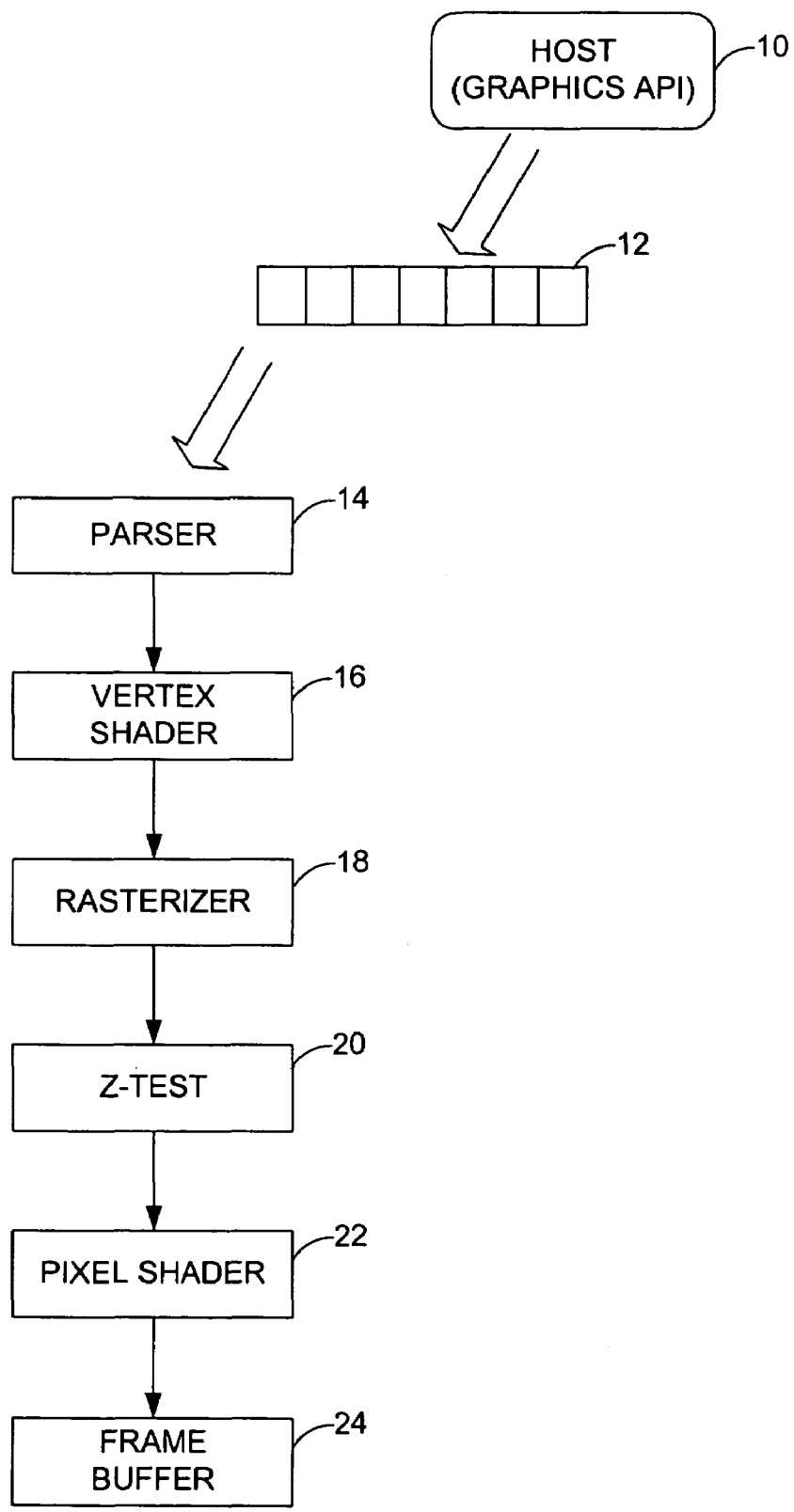
FIG. 1 is a block diagram of a conventional graphics pipeline, as is known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

As summarized above, the present application is directed to embodiments of systems for providing variable length compression between successive bit positions (or groups of bits) in a bit stream or a bit pattern. One embodiment of the invention includes logic elements referred to as packers and unpackers, incorporated in hardware for computer graphic systems. It should be appreciated that the invention, however, is not limited to this embodiment or environment. Implementations of embodiments of the invention include one or more logic elements for compressing data (sometimes referred to as a packer) and one or more logic elements for decompressing previously compressed data (sometimes referred to as unpacker).

As will be described further herein, there are several locations in a graphics system where features or aspects of the invention may be implemented. Likewise, it will be appreciated from the description herein that there are systems and environments in fields other than computer graphics where the concepts of the invention may be employed as well.

The bit compression, or pixel-packing, feature of one embodiment may be implemented prior to performing a pixel-shading operation. As the name implies, and as is known, pixel shading operations are performed on a per-pixel basis. However, for a variety of reasons, many pixels of a given primitive may not require the pixel shading operation. For example, pixels of a primitive that are covered by other primitives (e.g., as determined by a Z test) need not have the pixel shading operation performed on them. Such pixels may be identified and removed from the bit sequence, before being sent to the pixel shader. In this regard, a bit sequence may be compressed such that only pixels to be operated upon are sent to the pixel shader.

Figure 2:
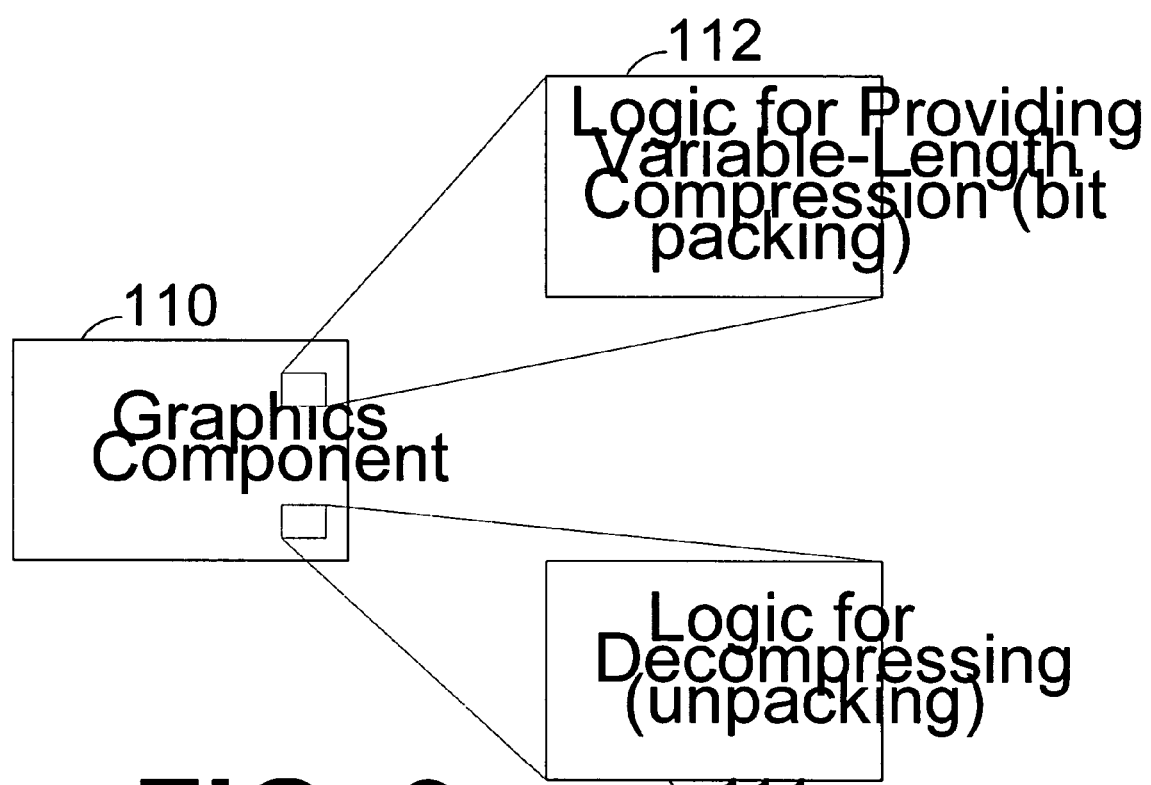
FIG. 2 is a block diagram illustrating certain elements of a graphics component constructed in accordance with one embodiment of the invention.

Reference is made briefly to FIG. 2, which illustrates certain basic components of an embodiment of the invention. FIG. 2 includes a component labeled "graphics component" 110, which may designate or represent hardware components in a graphics pipeline. Within this component, logic 112 may be provided for providing variable-length compression of a bit sequence (e.g., bit packing). Likewise, companion logic 114 may be provided for decompression (or unpacking) the bit sequence after processing. This embodiment of the invention may be implemented in systems that provide programmable processing for certain functions, referred as GPU (Graphic Processing Units), such as the pixel shading, rather than using dedicated hardware for performing this function. In such a system, the elimination of pixels that do not need to be processed, through the pixel packing process described herein, greatly improves the efficiency of the programmable GPU processor.

Figure 3:
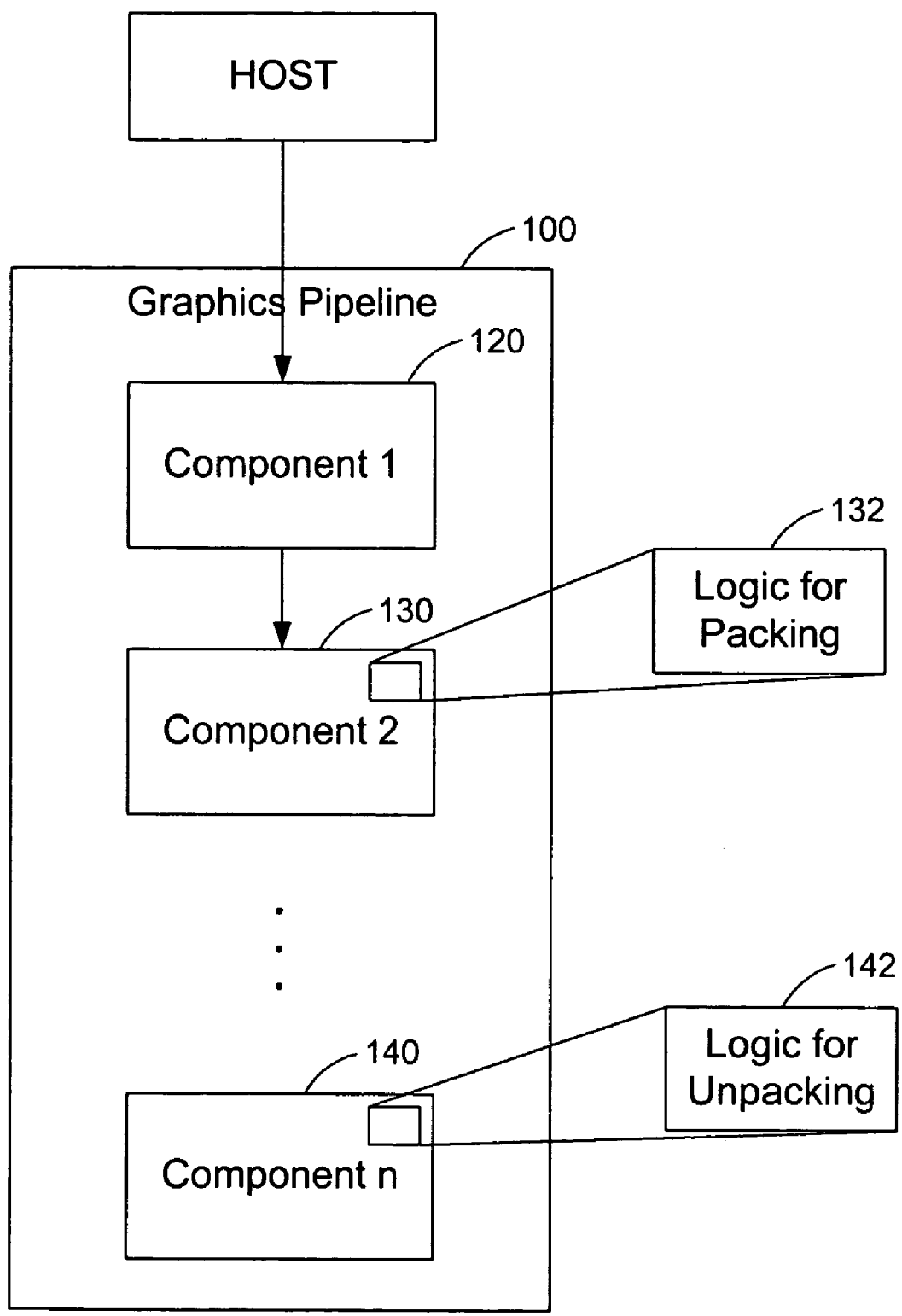
FIG. 3 is a block diagram illustrating elements of an embodiment of the invention, as embodied in components within a graphics pipeline.

Reference is made briefly to FIG. 3, which illustrates (generically) certain components of a graphics pipeline, which may implement features of embodiments of the invention. As illustrated, a host computer provides input to a graphics pipeline in the form of primitive and geometry data. This information and communication is well known, and need not be described herein. As is further known, the graphics pipeline includes a series of functional and/or logical components that perform processing tasks on the graphics information that is communicated from the host computer. These components are illustrated in FIG. 3 as component 1 120, component 2 130, . . . component N 140. These components may take on a variety of different forms, which may vary widely from implementation to implementation, as graphics hardware is known to have widely differing implementations. Generalizing, however, the front end of the processor (component 1 120) typically receives primitive geometry information and performs certain geometry or vertex-based operations. These type of operations include transformations, lighting, triangle set-up, etc. In some embodiments, the front end of the graphics pipeline may also include logic for performing a tessellation operation, which breaks up primitives into smaller primitives or triangles. After the graphics pipeline front-end operations, further processing such as span and tile generation (triangle rasterization), Z-test, pixel shading, alpha test/alpha blend, etc. may be performed. These operations are well known by persons skilled in the art, and therefore need not be described herein.

An embodiment of the present invention includes logic 132 for packing that performs a packing operation on a bit sequence in internal components of the graphics pipeline. In one embodiment, the packing operation is usefully employed on pixel, rather than vertex, operations. Furthermore, the logic for packing may be implemented in more than one internal component. For example, in one embodiment, the packing logic 132 may be provided before performing a pixel shading operation. Likewise, the packing function may also be employed in a Z compressor (which generates compressed Z information).

Logic for unpacking 142 may also be provided downstream of the packing logic 132. The unpacking operation is the substantial inverse of the packing operation, and is preferably implemented using a similar, companion logic structure and method as the packing operation. Indeed, the same mask used in the packing operation is used in the unpacking operation. Therefore, a description of the structure and operation of logic that performs the packing operation is sufficient to enable one skilled in the art to likewise implement an unpacking operation.

Figure 4:
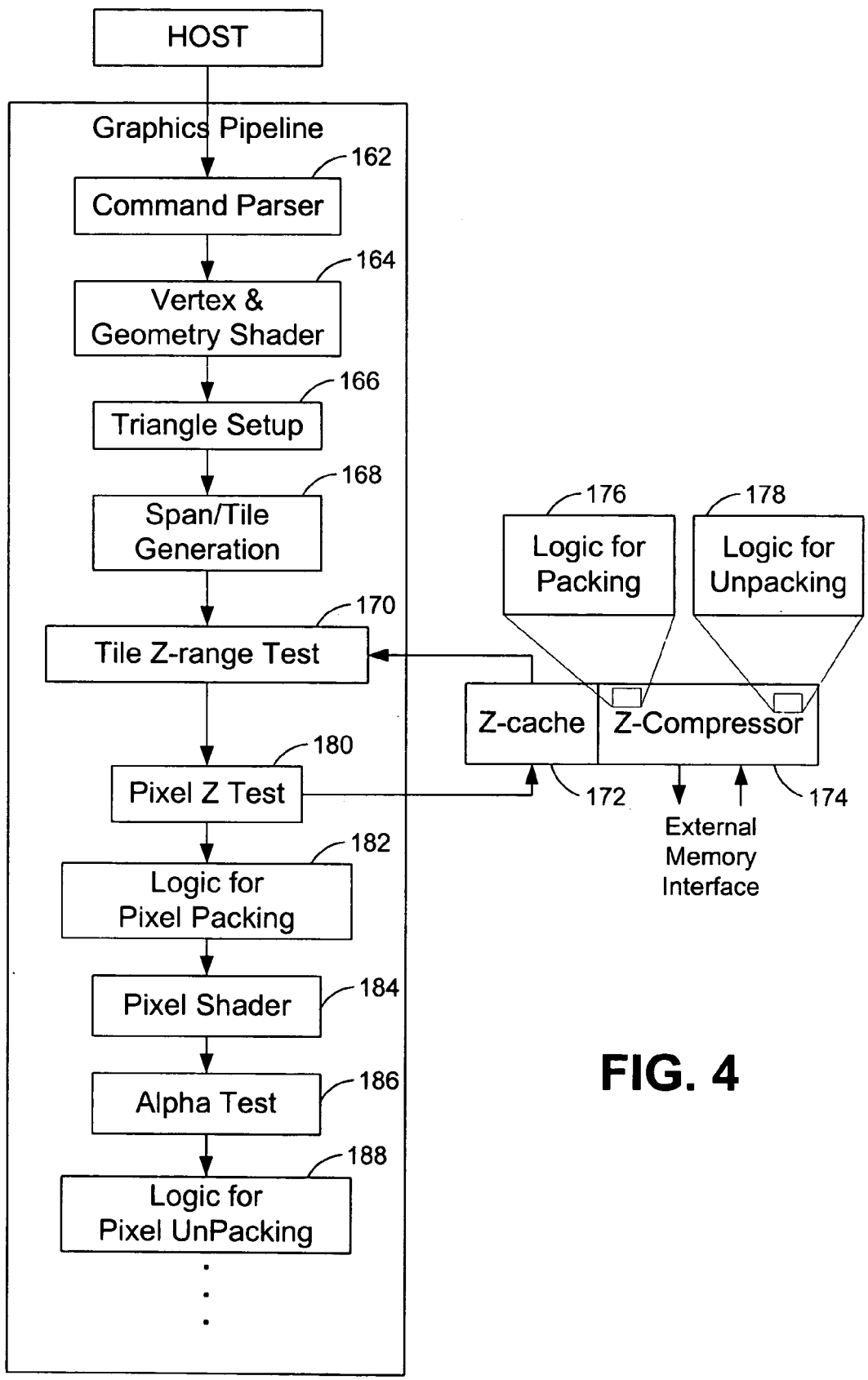
FIG. 4 is a block diagram illustrating a graphics pipeline having elements that are constructed in accordance with an embodiment of the invention.

FIG. 4 illustrates certain of these components in one embodiment of a graphics pipeline implementing packing and unpacking functions.

More specifically, FIG. 4 illustrates an embodiment of the present invention in which a graphics pipeline, employing many conventional components, embodies certain inventive features. For example, the command parser 162, vertex and geometry shader 164, triangle setup 166, and the span/tile generation 168 are well-known operations, and need not be described herein. Also known is a z-range test 170, in which a z-test is performed on compressed z-data. Compressed z-tests performed in this way may improve efficiency by trivially accepting or trivially rejecting certain primitives (or alternatively ranges of pixels) based upon compressed z-information. A similar, per-pixel, test may be performed by the pixel z-test block 180.

A z-cache 172 may be coupled to both blocks and provide a high speed memory access for z-data (e.g., higher speed retrieval and access than from the z-buffer memory). A z-compressor 174 may also be provided. As is known, z (or depth) data may be compressed for evaluation and efficiency enhancements. In one embodiment of the invention, however, the mechanism for compressing z-information may embody elements for packing 176 and unpacking 178 z-data. In this regard, and as will be described in more detail below, a pixel mask (generated using depth information) may be utilized to define variable shift lengths, which cause bits or data in a data stream to be shifted so as to overwrite data preceding the data being shifted. Prior to performing this compression/shift operation, a determination may be made as to pixel data that is not to be affected by a computation (such as the z-range test).

As is known, there are various ways to compress z-data. One straightforward approach is, for a given tile (a 4×4 pixel tile, 8×8 tile, or other size tile) to save only the minimum and maximum z-values for that tile. In such a situation, a 16-pixel tile would be compressed from sixteen down to two z-values (the minimum and the maximum). The z-compressor 174 may generate a pixel mask of this 4×4 tile by allocating a single bit to each tile position and recording a one in the bit for a given tile position if that pixel is either a minimum or maximum z-value for that tile. Zeros would be recorded in all remaining bit positions. The logic for packing 176 may then left-shift the pixel information associated with the pixel positions having mask values of one, while removing all other pixel information. Only this compressed information, in one embodiment, is sent to the block 170 for performing the z-range test. Eliminating data that would not be impacted by the calculation of the z-range test reduces the computations performed by that logic block, and therefore improves its calculation efficiency.

The graphics pipeline of FIG. 4 also illustrates logic for performing a pixel packing operation 182, a pixel shader 184, a block for performing an alpha test 186, and logic for performing a pixel unpacking operation 188. The pixel shader 184 and alpha test 186 blocks perform functions that are known in the art, and need not be described herein. As the name implies, the pixel shader 184 performs shading operations on a per-pixel basis. For a given graphic primitive that is being operated upon, or for a given tile in tile-based operations, often a number of the pixels will ultimately not be visible to a user (based on depth information, obstruction by other objects between the current pixel and the view point, etc.). For all such pixels, the pixel shading and alpha test operations need not be performed. Therefore, it may be desired to compress the pixel information so that only information or data to be impacted by the computations performed by the pixel shader and/or alpha test operations are passed through the pipeline to those logic blocks.

The logic for pixel packing 182 may perform a compression on the pixel data passed to it from above in the graphics pipeline. The logic for pixel packing 182 may operate similar to the logic for packing 176, which was summarized above in connection with the z-compressor 174. As will be described in more detail below, a mask (such as a pixel mask) may be formed, based upon depth information, and used to control compression of the data. Specifically, data that is to be used or impacted in performing pixel shader and alpha test operations is compressed, while data not to be affected by those operations or computations is removed from the bit stream before it is passed through the pipeline to the pixel shader 184 and alpha test 186 logic blocks. Ultimately, this removed data is restored by the logic for pixel unpacking 188.

Figure 5:
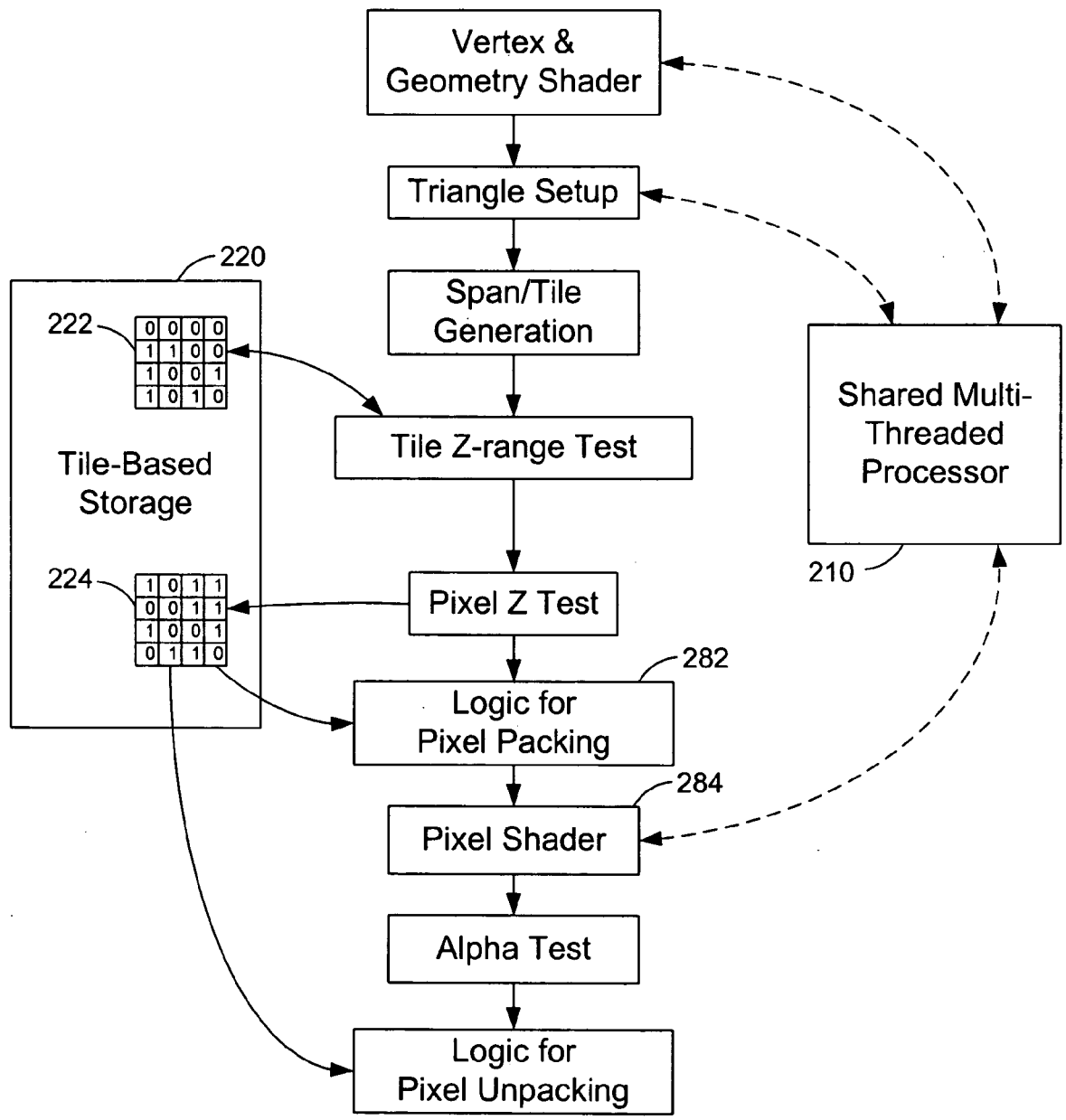
FIG. 5 is a block diagram illustrating portions of a graphic system constructed in accordance with another embodiment of the present invention. See changes on FIG. 5.

Referring briefly to FIG. 5, a portion of the components illustrated in FIG. 4 is illustrated. Further, in FIG. 5, the embodiment is illustrated in a graphics pipeline having a shared multi-threaded parallel processor that is available for performing centralized processing operations for several of the logic components within the graphics pipeline. In this embodiment, rather than each component or logic block in the graphics pipeline being performed by dedicated hardware, certain processing functions may be communicated to a centralized and shared programmable processing resource 210 for execution. In one embodiment, the processing unit may be implemented as a multi-threaded processor 210. Such a processor may include scheduling logic for managing tasks that are communicated to it for processing. As is described further herein, the logic packing 282 may be controlled by a suitable mask 224 (such as a pixel mask), which may identify the bit (pixel) locations or positions that should be preserved, as well as those that may be discarded in the compression or packing operation. This mask 224 may be stored in a storage region 220 that is centrally accessible, as it may be used by the logic for unpacking, so that the original bit sequence may be restored.

From an operational or functional standpoint, the elements illustrated in FIG. 5 perform similar to the corresponding elements of FIG. 4. However, since the graphic system of FIG. 5 includes a shared multi-threader processor 210, some of the operations that are performed in the individual logic blocks may be centrally performed by the processor 210. In such an embodiment, the internal structure of the various logic blocks may differ slightly, even though the functional aspect is the same (as that of FIG. 4).

As described in FIG. 4, pixel masks may be used by the packers and unpackers (i.e., compressors and decompressors) for the data. FIG. 5 illustrates two such masks 222 and 224, which may be stored, along with other data, in a tile-based storage area 220. Of course, the contents of a pixel mask 222, for a given tile, for the z-compressor may be different than the content of the pixel mask 224 of the corresponding tile for the pixel packer. Therefore, these masks have been separately illustrated in FIG. 5.

It should be appreciated that, in systems such as that illustrated in FIG. 5, the benefits of the compression performed in embodiments of the invention are significant. That is, in an embodiment utilizing shared resources of a multi-threaded processor 210, overall system efficiency is significantly enhanced if the efficiency of the multi-threaded processor is enhanced. Without implementing the compression of an embodiment of the invention, the pixel shader 284 may otherwise send data for all pixels to be processed by the processor 210. For pixels that are not to be visible on the display, any processing performed on such pixels in the pixel shading operation is effectively wasted processing. The utilization of a shared resource, such as the processor 210, in performing this operation, prevents the processor from processing other requests or performing tasks for other elements within the pipeline. Therefore, the compression performed by the logic for pixel packing 282 provides significant performance improvements of the processor 210, as it operates in the system as a whole.

Reference is now made to FIG. 6, which illustrates the generation of a mask of a type that may be utilized in embodiments of the present invention, described hereinafter. It should be appreciated that the illustration of FIGS. 6A–6F are significantly simplified to facilitate the illustration of certain aspects of embodiments of the invention. However, the simplified illustration provided herein is sufficient for persons skilled in the art to implement more complex and realistic examples.

Referring first to FIG. 6A, a triangle primitive 320 is shown within the boundaries of a display 310. As is well known, a computer graphics display will typically render thousands, and often hundreds of thousands, of primitives in a single graphics display. Primitives are frequently broken down to triangle primitives, such as triangle 320. As is known, early (front end) components in a graphics pipeline perform certain setup and vertex-based operations on the primitives. Span and tiled generation components will break a primitive up into scan lines 322 (FIG. 6B) and tiles defined by vertical lines 324 crossing the span lines 322 (FIG. 6C). Squares on the tile are often grouped into tiles of 2×2, 4×4, 8×8, or other sized dimensions. FIG. 6D illustrates a tile 326 having a dimension of 4×4 pixels. The alignment of tile 326 is arbitrarily illustrated with reference to the triangle primitive 320. The portions of the triangle primitive 320 that fall outside the 4×4 tile are discarded, and FIG. 6E illustrates the tile 326 and the overlapping portion of the triangle primitive 320, shown in crosshatch 328. Each pixel may there after be represented by a one or a zero (single bit) to indicate whether the primitive 320 occupies a predominate portion of a given pixel or not. In this regard, it is observed (from FIG. 6D) that five of the pixels of the tile 326 are completely covered by the primitive 320. These are the four pixels of the bottom right hand corner of tile 326 and the pixel above the four. Likewise, the four pixels along the left vertical edge of tile 326 are not covered at all by the primitive 320. The remaining pixels have some portion that are covered by the primitive 320. Mechanisms to minimize aliasing or provide blending of primitives whose boundaries fall across pixels are well known and need not be described herein. From a relatively straightforward standpoint, a pixel mask 330 (see FIG. 6F) may be created by placing a one (single bit) in the pixel locations in which a majority of the pixel is covered by the primitive 320. The result may be a pixel mask having content such as that illustrated in FIG. 6F.

While the foregoing presents one method for generating a pixel mask, more complex methods may be (and will likely be) implemented as well. For example, depth information of other primitives that may fully or partially overly a current primitive may be taken into consideration as well. It will be appreciated, however, the present invention is not limited to any particular method or methods for generating a pixel mask, but that a variety of methods, consistent with the scope and spirit of the present invention may be implemented. In this regard, embodiments of the invention that call for the generation of a pixel mask (or other mask) contemplate a wide variety of methods for generating such masks.

Figure 7:
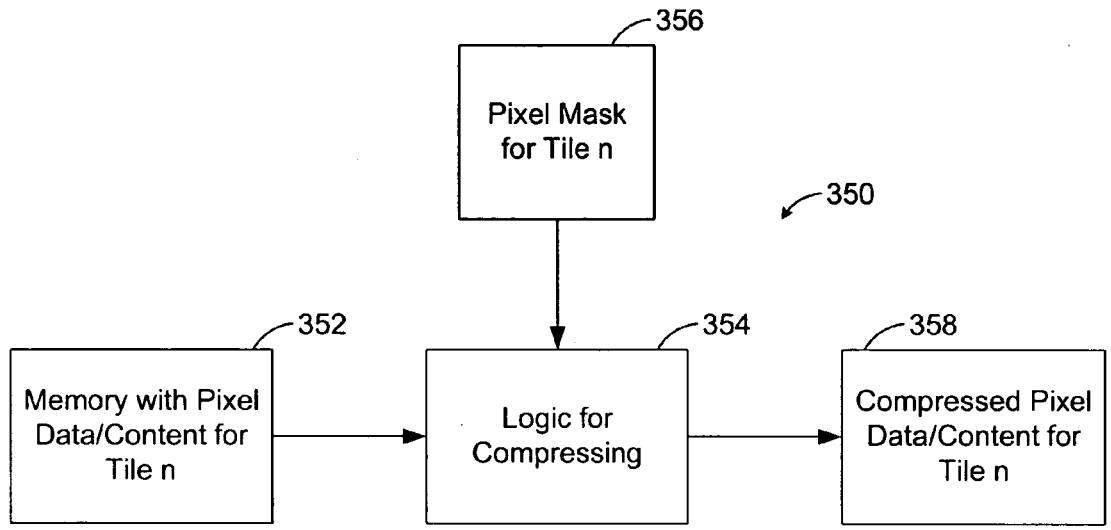
FIG. 7 is a block diagram illustrating components of a graphic system for compressing data, in accordance with an embodiment of the present invention.

Having set forth the foregoing, reference is now made to FIG. 7, which is a block diagram illustrating one embodiment of the present invention. Specifically, FIG. 7 illustrates a portion 350 of a graphic system for compressing pixel data for subsequent operations by elements within a graphics pipeline or graphic system. As previously illustrated, graphics information is passed into a graphics pipeline from a host. Certain setup and vertex operations may be performed, but graphics data is ultimately stored in a memory. After span and tile operations have been performed, such a memory may hold graphics data or content for a plurality of tiles of pixels. FIG. 7 illustrates a memory 352 having pixel data or content for a given tile n. Of course, the memory 352 may include data for other tiles as well. Logic 354 is provided for compressing the content of the graphics data for subsequent operations or computations by other components in the graphic system. The compression logic utilizes a mask for performing the compression. In this regard, the mask identifies pixel locations having data that is not to be affected by a subsequent operation or computation, and therefore may be removed during the compression operation. In the preferred embodiment, the mask is a pixel mask.

As further illustrated in FIG. 7, a pixel mask 356 is provided for tile n, which is to be compressed. In one embodiment, the logic for compressing 354 generates an output 358 containing the compressed pixel data or content for tile n. In an alternative embodiment, the output of the logic for compressing 354 may simply be an identification of memory locations within the memory 352 of the data that is to be operated upon (effectively decompressed data). The processor or other operational element within the graphic system that is to perform an operation upon the compressed data may retrieve the data from the memory 352, if appropriate.

In one embodiment, the elements of FIG. 7 may be replicated to perform compression of multiple tiles of pixel data. In another embodiment, the elements illustrated in FIG. 7 may be scalable so as to store and manage the compression of multiple tiles of pixel data.

Figure 8:
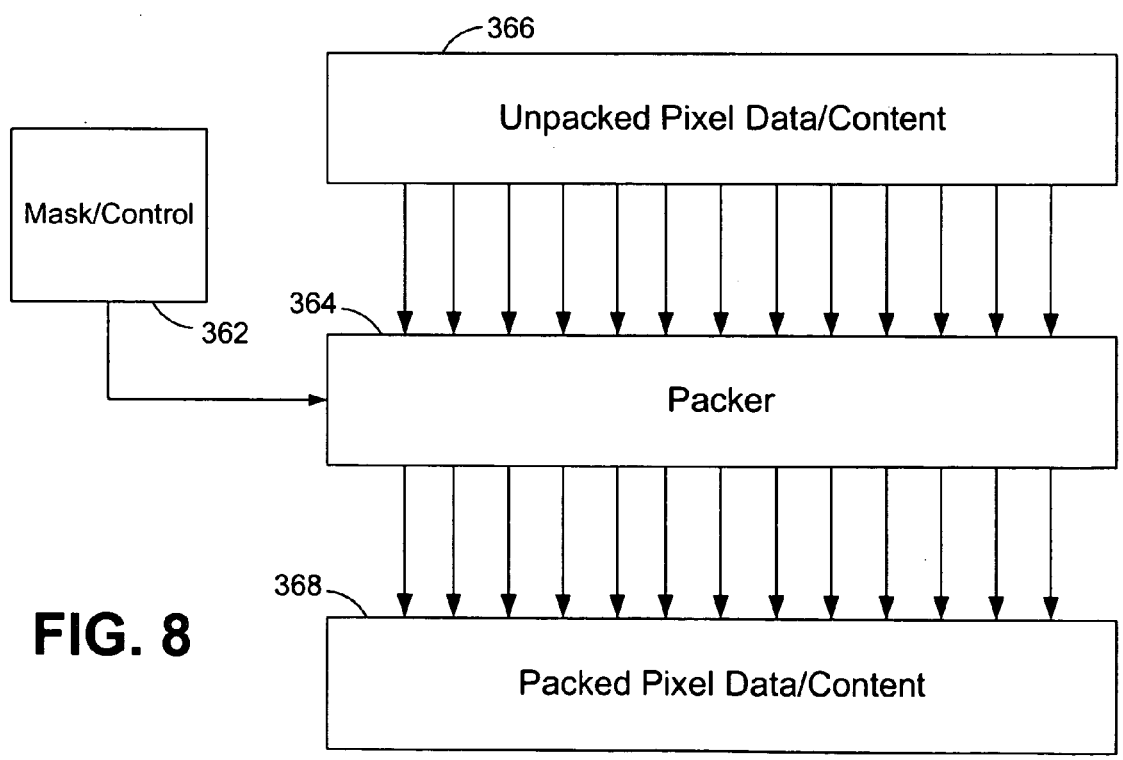
FIG. 8 is a block diagram illustrating components of a system for compressing data in accordance with another embodiment of the present invention.
Figure 9:
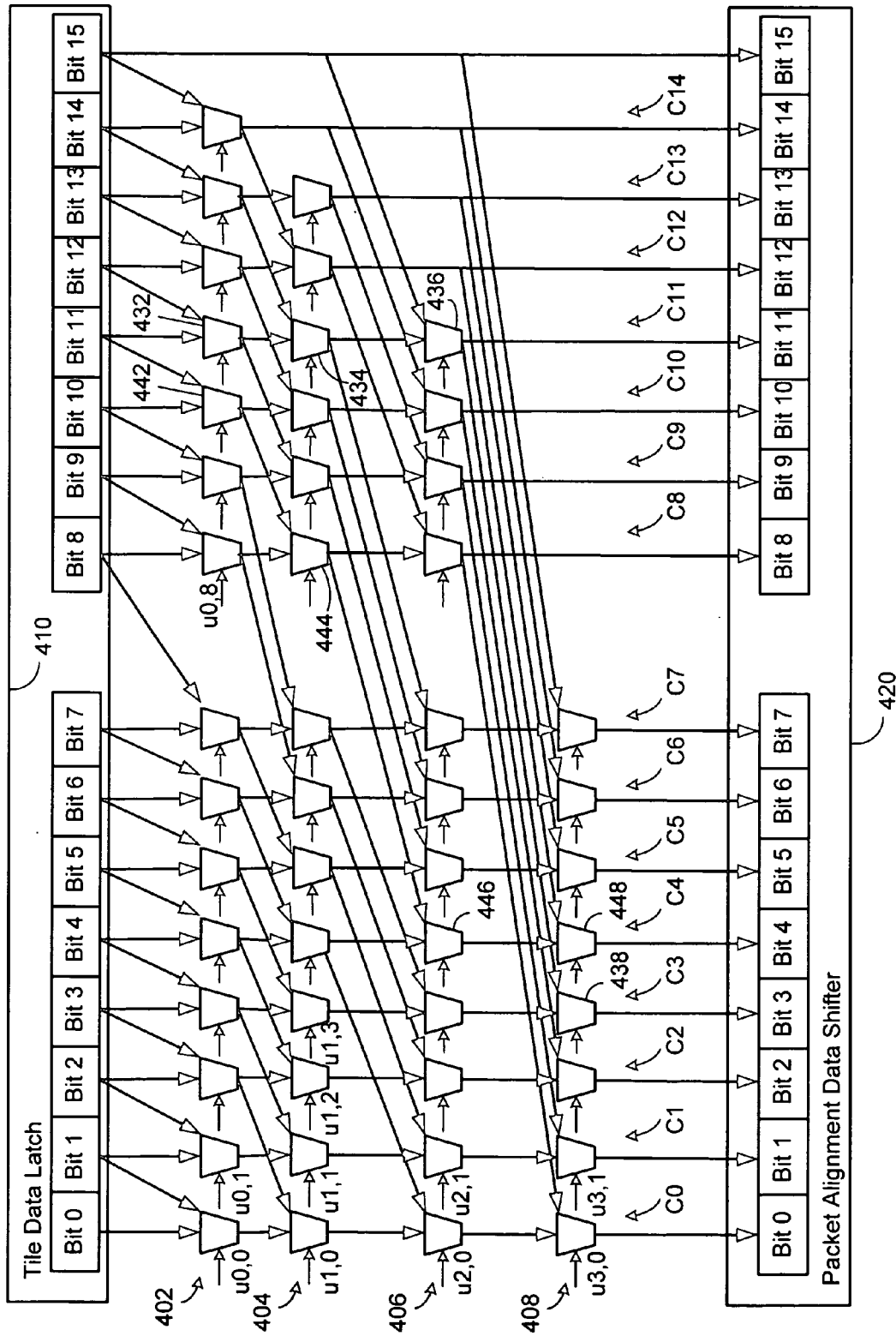
FIG. 9 is a diagram illustrating one embodiment of a logic component for compressing signals, bits, or positions within a data stream, in accordance with an embodiment of the present invention.
Figure 10:
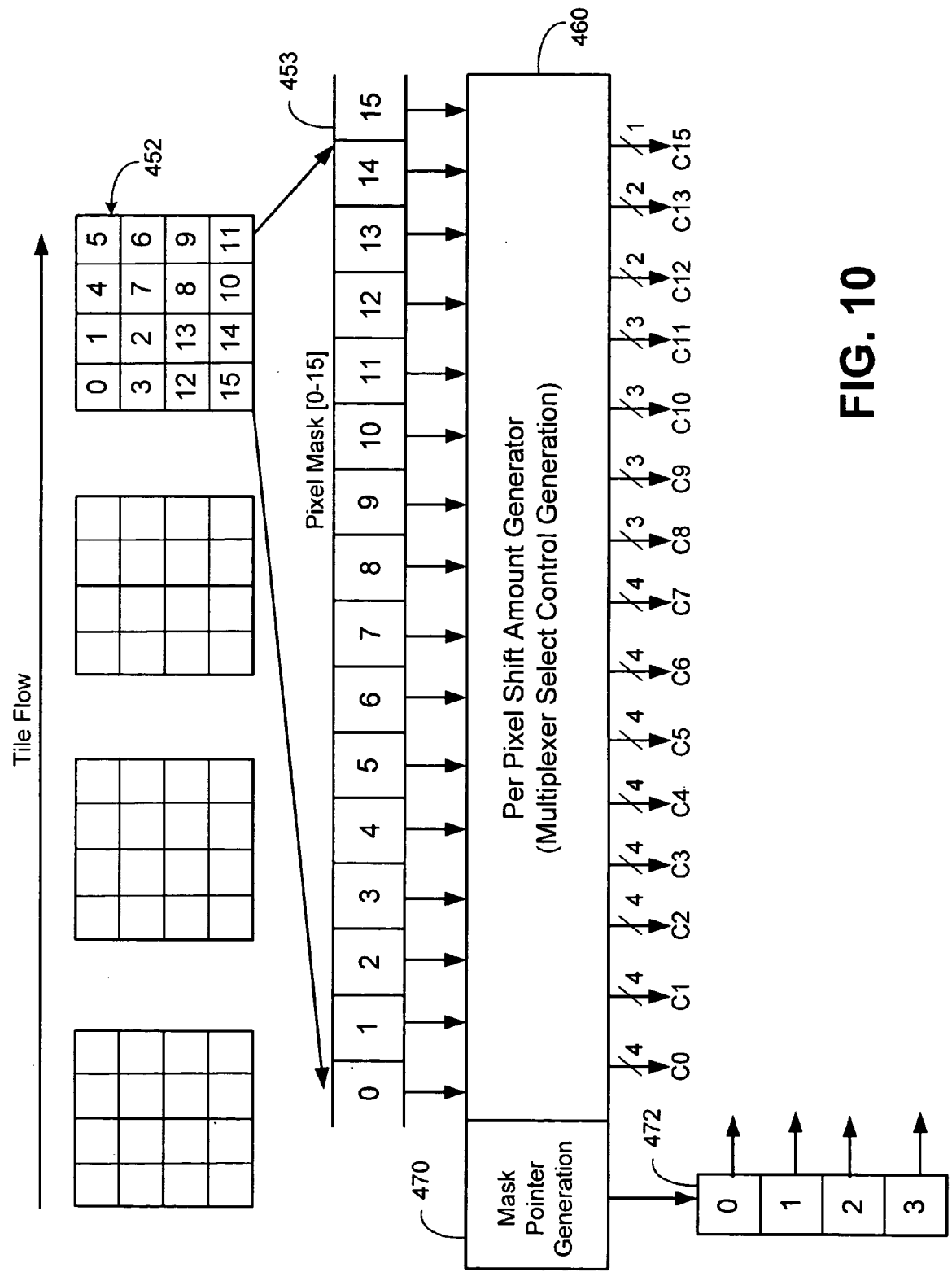
FIG. 10 is a block diagram illustrating a mechanism for generating select signal lines for the multiplexers shown in FIG. 9, in accordance with an embodiment of the present invention.
Figure 11:
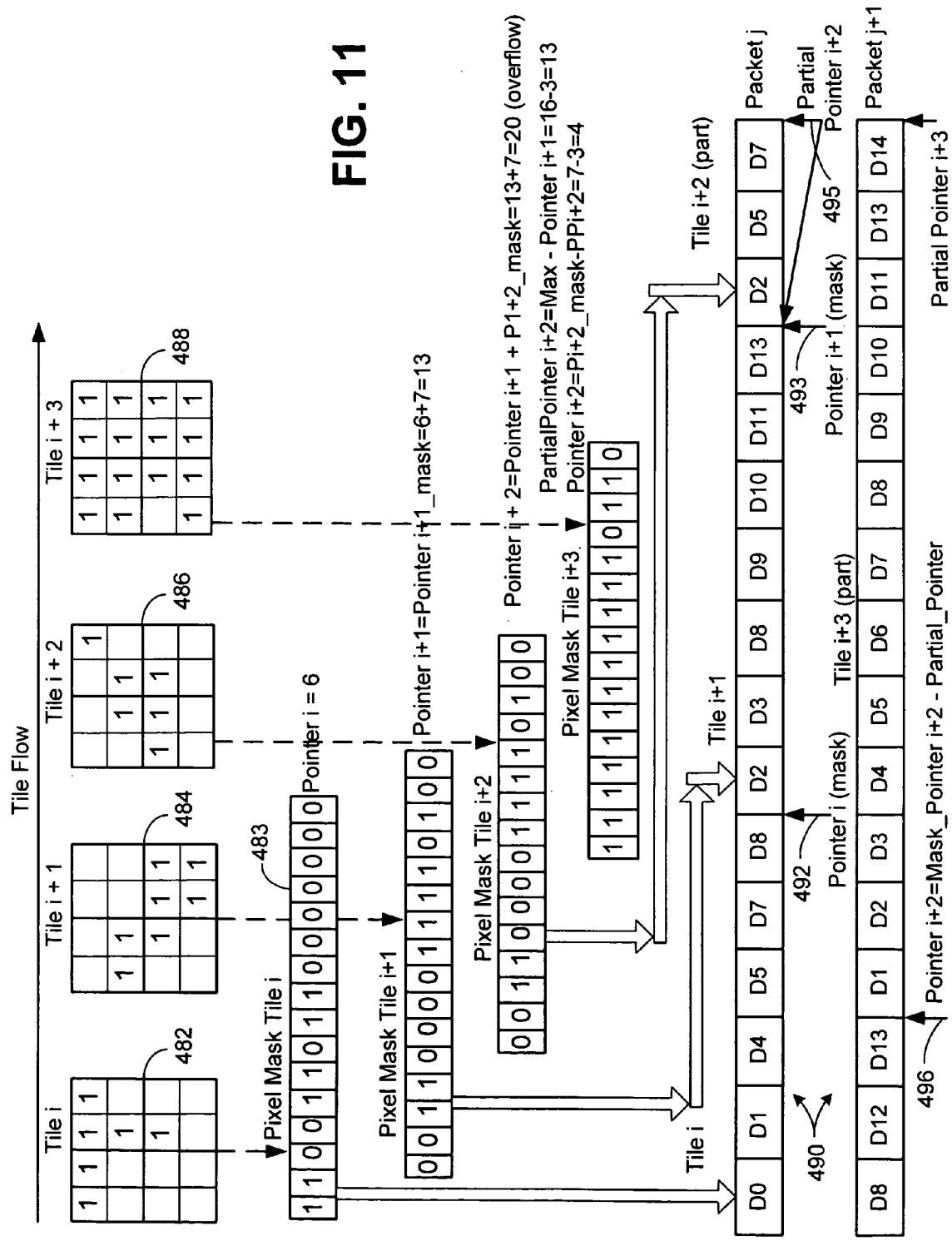
FIG. 11 is a block diagram illustrating the creation of a data stream having compressed data, in accordance with one embodiment of the present invention.

Reference is now made to FIG. 8, which is a block diagram of an alternative embodiment of the present invention. In this embodiment, a mask (such as a pixel mask) is used by a controller 362 to control the operation of a packer 364. The packer 364 performs a variable-length compression operation on unpacked pixel data 366 that is provided to input the packer (or otherwise associated with the signals provided to the input). The output of the packer 368 comprises compressed or packed pixel data (or signals associate with the compressed or packed data). Consistent with the scope and spirit of the present invention, there are a variety of methods and architectures that may be implemented within the components of FIG. 8. FIGS. 9–11 below illustrate one exemplary embodiment. However, it should be understood, except as expressly recited in the appended claims, the present invention should not be construed as limited to the embodiment illustrated in the following figures.

Reference is now made to FIG. 9, which is a diagram that illustrates one potential implementation for logic that performs a compression of data in accordance with an embodiment of the invention. The logic 400 of FIG. 9 may be used to implement the packer 364 of the embodiment of FIG. 8, as well as that logic for compressing 354 of the embodiment of FIG. 7. With regard to this particular implementation, FIGS. 9, 10, and 11 may be viewed collectively to gain a more complete understanding of the manner in which a mask may be used to variably compress data (or groups of bits) in accordance with one embodiment.

Beginning with FIG. 9, data to be compressed may be provided in a latch, such as a tile data latch 410. In the illustrated embodiment, there are 16 bit positions (bit 0 through bit 15) of the data that is to be compressed. A signal output of each of these bit positions is connected to an input of a multiplexer that is arranged in a first row of multiplexers. In one embodiment, each bit position of the tile latch 410 corresponds to (or is associated with) a bit position within the mask (e.g., FIG. 6F) that is used to define the compression for the data associated with the tile data latch 410. It should be appreciated that there are various ways that data may be compressed using the structure of the logic of FIG. 9. For example, if each position defined within a mask (e.g., FIG. 6F) corresponds to one or more bytes of data (which in most embodiments it will), then the structure of FIG. 9 may be replicated for each bit of information corresponding to a given a tile position. By way of example, if each position of the mask corresponds to a byte (8 bits) of data, then the structure of FIG. 9 may be effectively cascaded eight layers deep. The bit 0 position of the tile data latch 410 of the first layer may hold the least significant bit of the byte of data within the data range to be compressed. Likewise, the bit 0 position of the tile data latch 410 of the second layer of the logic of FIG. 9 (successive layers not illustrated) may hold the next least significant bit of the data corresponding to that mask location. Replicating the structure illustrated in FIG. 9 in this way allows groups of bits to be compressed. As will be described below, all bits in a group (e.g., all bits associated with a given bit position of the tile data latch) are either retained or discarded in a compression operation. That is, if the bit of bit 0 position of the first layer is not discarded through compression, then none of the bits of the bit 0 position (of any layer) will be discarded through compression. Likewise, if the bit of bit 0 position of the first layer is discarded through compression, then all of the bits of the bit 0 position (of any layer) will be discarded through compression.

The structure of FIG. 9 may also be utilized in alternative ways to achieve data compression. For example, in embodiments where large amounts of data are associated with each bit position of the tile data latch, replicating the structure of FIG. 9 to accommodate every bit position of the data may result in an undesirably large amount of hardware. In such an embodiment, the data that is stored in the tile data latch may be address data (or a pointer) that points to the start of a data record in memory (again multiple layers of the logic structure of FIG. 9 may be used). A priori information about the data stored at those memory locations would allow such an embodiment to be used. This would reduce the logic required as a smaller group of bits may be utilized to define the address of data, that actually required for handling the data itself.

For example, in a computer graphics system, there may be a significant amount of graphics data associated with each pixel position. This graphics data may include color information, such as red, green, blue and alpha (R,G,B,A), depth information (Z), texture information (U and V coordinates), etc. If a given pixel is not to be displayed, then all of the corresponding information associated with that pixel may be compressed to removed if from certain calculations within the graphics pipeline.

The operation of the structure of FIG. 9 will now be described in the context of compressing single bits of data. Again, however, it should be recognized that the logic of FIG. 9 may be readily replicated (or scaled) through additional layers to compress groups of bits of data.

The logic of FIG. 9 provides one structure for variably compressing bits of data (or groups of bits of data) based upon a mask, by shifting data that is to be compressed into bit positions of data that are to be removed. The structure of FIG. 9 allows for very robust operation in this regard, and the structure of FIG. 10 (described below) provides the control of the various select lines of the multiplexers used in FIG. 9. First describing the structure of FIG. 9, the structure is realized using a plurality of rows of multiplexers 402, 404, 406, and 408. The multiplexers of the a first row of multiplexers 402 have inputs that are connected to signal lines output from the various bit positions of the tile data latch 410. Each successive row of multiplexers 404, 406, and 408 similarly have inputs that are connected to outputs of multiplexers from the preceding row. Through controlled selection of the various multiplexer inputs, the signal value of a given bit position of the tile data latch 410 may either be passed straight through to a corresponding bit position of the packet alignment data shifter 420, or alternatively shifted any number of bit positions to the left. As an example, suppose the data value of bit position 11 of tile data latch 410 is desired to be shifted to bit position 3 of the packet alignment data shifter 420. This is accomplished by controlling the select inputs for multiplexers 432, 434, 436, and 438. Specifically, the control input of multiplexer 432 is controlled to select (at its output) the signal value held in bit position 11. Multiplexer 434 is controlled to select (as its input) the output of multiplexer 432. Likewise, multiplexer 436 is controlled to select (as its input) the output of multiplexer of 434. Finally, multiplexer 438 is controlled to select the output of multiplexer 436.

As can be verified by a ready inspection of the drawing of FIG. 9, each multiplexer has two inputs and a single output. As viewed in the drawing, the 0 input is on the left-hand side of each multiplexer, and the 1 input is on the right-hand side of each multiplexer. Each multiplexer in the first row 402 of multiplexers has as its "0" input the corresponding bit position of the tile data latch 410. Each multiplexer of the first row has as its "1" input, the bit position of the tile data latch 410 one bit to the right of the corresponding bit position. For ease of nomenclature, the multiplexers of FIG. 9 can be viewed as a matrix, wherein the multiplexers can be designated by the nomenclature R,C, where R designates the row number, and C designates the column number. Therefore, the multiplexers of the first row 402 may be designated as multiplexers 0,0 (e.g., u0,0) through 0,14. Likewise, the multiplexers of the second row 404 may be designated as multiplexers 1,0 through 1,13. The multiplexers of the third row 406 of multiplexers may be designated by numbers 2,0 through 2,11. Finally, the multiplexers of the last row 408 may be designated by numbers 3,0 through 3,7. Due to the density of the elements shown in FIG. 9, only a sampling of the multiplexers have been designated in this way.

As illustrated, each successive row of multiplexers has fewer than the preceding row. Further, each multiplexer of the first row has its inputs connected to two adjacent bit positions of the input data. Each multiplexer of the second row has its two inputs connected to the output of every other multiplexer of the first row. Likewise, every multiplexer of the third row 406 has its two inputs connected to outputs of every fourth multiplexer in the second row. Finally, each multiplexer of the fourth row 408 has its two inputs connected to every eighth multiplexer of the third row 406. With the multiplexers being connected in this fashion, the select signal lines in the multiplexers of the fourth row control a shift of either zero or eight bits (with reference to original bit positions in the tile data latch 410), depending upon the input selected. Likewise, the multiplexers of the third row 406 control a shift of either zero or four bits, depending upon the input selected. Similarly, the multiplexers of the second row 404 control a shift of either zero or two bits, depending upon the input selected, and the multiplexers of the first row 402 control a shift of either zero or one bit, depending upon the input selected.

The previous example illustrated how multiplexers 432, 434, 436, and 438 may be controlled to shift bit 11 of the tile data latch 410 into the bit 3 position of the packet alignment data shifter 420. This comprised a shift of eight bits. If the same data bit (bit position 11 of the tile data latch 410) were desired to be shifted seven positions (into the fourth bit position of the packet alignment data shifter 420), such could be accomplished by select control of the select lines of the multiplexer 442, 444, 446, and 448. In this regard, multiplexer 442 may be controlled to select the input connected to the eleventh bit position of the tile data latch 410. Similarly, multiplexer 444 may select the output of multiplexer 442, while multiplexer 446 selects the output of multiplexer 444, and multiplexer 448 selects the output of multiplexer 446.

It should be appreciated that the structure of the logic of FIG. 9 is readily scalable for masks of various sizes (e.g., data tile latches having differing numbers of bit positions). For example, if the mask were sized as a 2×2 instead of a 4×4 mask, only three rows of multiplexers would be required. These would effectively take the form of the three rows of multiplexers shown on the right half of FIG. 9. Similarly, if the logic of FIG. 9 were expanded to accommodate an 8×8 mask, then an additional row of multiplexers would be required. In this regard, the structure of FIG. 9 is readily scalable by a power of two to accommodate different mask sizes.

It should be appreciated that a key operational aspect of the logic illustrated in FIG. 9 relates to the generation of control signals for controlling the proper selection of the various multiplexers. One way of generating these control signals is illustrated in the diagram of FIG. 10. As previously described herein, certain embodiments of the invention implement masks in the form of pixel masks or tiles. Differing masks may be used on different tiles of pixels, and indeed for different primitives. The embodiment of FIG. 10 illustrates the generation of control signals for the multiplexers of FIG. 9, in an embodiment using a 4×4 mask 452. The bit positions within each tile are assigned a sequence order. In this regard, the arrangement or assignments of a particular sequence order is arbitrary, but should be fixed and known for the various tiles. For all examples of embodiments described in this application, the sequence order or arrangement in 4×4 masks are as illustrated in the mask 453. That is, the top left position is the zero position, with the position immediately to the right being the one position, the position immediately below the one position being the two position, and so on as specifically illustrated in FIG. 10. Logic 460 is provided to determine or define the per-pixel shift amount. In this regard, the logic 460 generates the control signals for the multiplexers of FIG. 9. In one embodiment, the various control values for controlling the individual multiplexers may be generated by a ROM that is hard coded with the bit values of the tile mask providing the addressing inputs to the ROM. The multiplexing and control structure shown in FIG. 9 can readily be verified as providing any appropriate level of shift to any pixel-pixel slot. Further, by ignoring or overriding all zero values in the pixel mask, a compression of the bit sequence is achieved.

Returning briefly to FIG. 9, in addition to being arranged in rows, the various multiplexers are also arranged in columns, denoted as C0 through C14. The logic 460 of FIG. 10 generates groups of outputs, which are the select (control) lines for the multiplexers of various columns. As illustrated in FIG. 10, there are four signal lines for each of columns C0 through C7, there are three signal lines for each of columns C8 through C11, two signal lines for each of columns C12 and C13, and one signal line for the multiplexer of column C14 (since there is only one multiplexer in that column).

The logic or circuitry within the multiplexer control logic 460 may be implemented in a variety of ways. From a functional standpoint, the value produced on the signal lines for a given column of multiplexer control signals (e.g., C3) results from a computation of the sum of all preceding bit positions of the pixel mask 453. As previously described, each position of the pixel mask 453 is a single bit (either a 0 or a 1). A zero value in the mask indicates that the data corresponding to that position is not to be impacted by a subsequent computation (or is otherwise to be removed in the compression operation). In contrast, a logic one in a particular position of the pixel mask indicates that the corresponding data is to be impacted by a subsequent computation (or is not to be removed from the data compression operation). Therefore, when computing the summation for a given group of signal lines for a column of multiplexers (e.g., C3), the summation of bit positions of the preceding columns (bit positions 0, 1, and 2) are computed. In keeping with this illustration, there are four multiplexers in column 3, and the multiplexer control logic 460 generates a four bit output (C3) for controlling those multiplexers, based on the summation of bit positions 0, 1, and 2. Of this four-bit output, the most significant bit controls the multiplexer of row 408, while the least significant bit controls the select lines of the multiplexer in row 402.

Figure 12A:
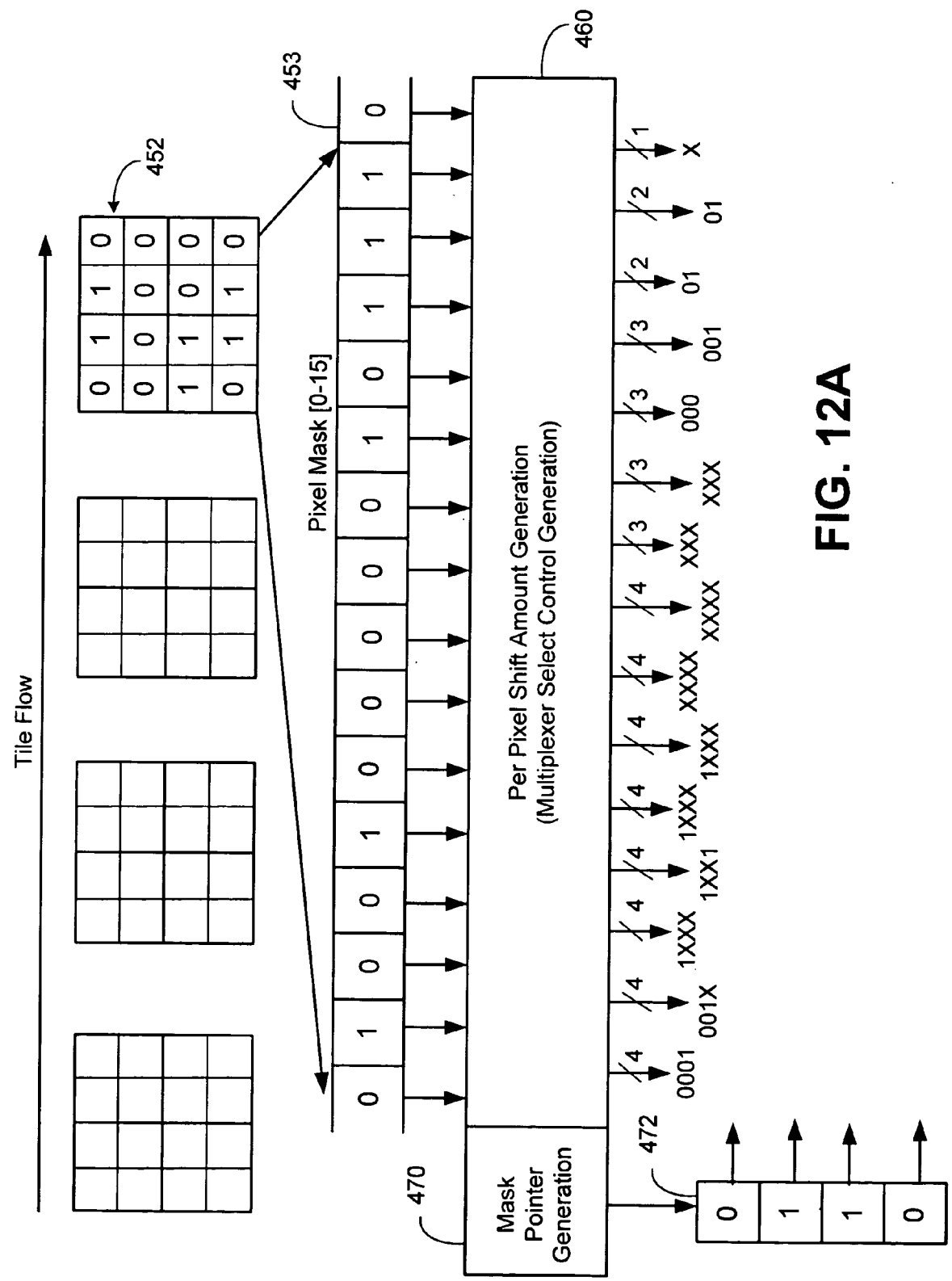
FIGS. 12A and 12B are diagrams similar to FIGS. 10 and 9, respectively, illustrating the operation of the logic elements of those figures with a hypothetical example.
Figure 12B:
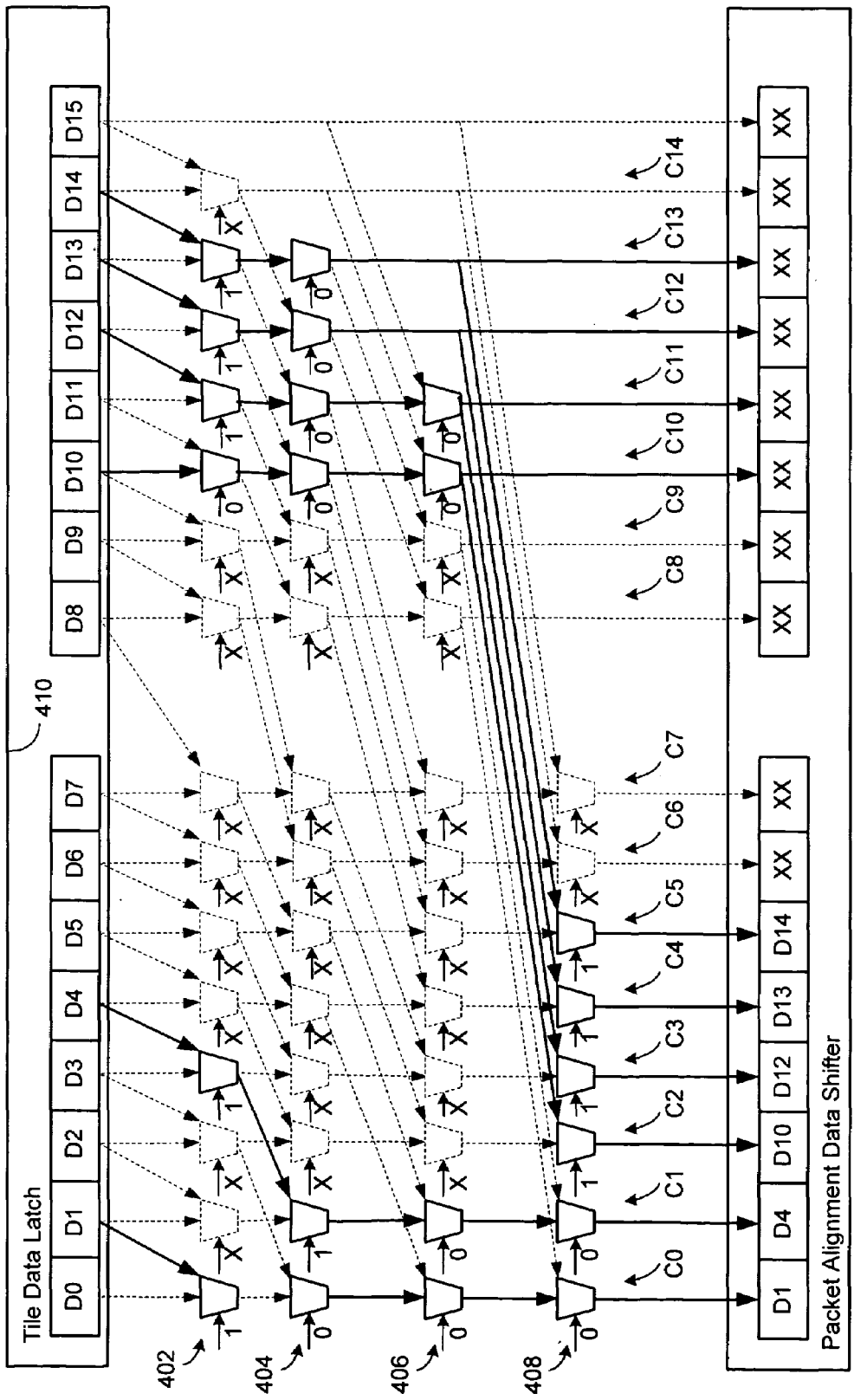

Reference is made briefly to FIGS. 12A and 12B, which correspond to FIGS. 10 and 9 (respectively), providing an example of the operation of this embodiment for a given pixel mask. As illustrated, there are six different positions within the pixel mask in which the corresponding data is to be preserved in the compression operation. This corresponds to the data of mask positions 1, 4, 10, 12, 13, and 14. The various multiplexer select values are shown at the outputs of the logic 460 for this example, and a number (either 0 or 1) is denoted next to each multiplexer select line, to show the value that would be applied to each respective select line. Likewise, the input data (at the tile data latch 410) is generically denoted as D0 through D15. As illustrated at the output of the packet alignment data shifter 420, data values D1, D4, D10, D12, D13, and D14 have been shifted into the six left most positions of the data shifter 420. To facilitate this illustration, in FIG. 12B, data paths that are unused for the transport of data in this particular example are illustrated in dash lines. Likewise, multiplexers that are not utilized for transporting data are illustrated in dash line, and their control/select input is denoted with an X (don't care value).

Returning now to FIG. 10, also illustrated is mask pointer generation logic 470 and its output 472. In the context of a graphics system, the data corresponding to numerous tiles for a single display screen will be compressed. The compression amount will vary from tile to tile (depending upon the masks of the individual tiles), and as will be described in more detail in connection with FIG. 11, a system may denote, or otherwise mark, tile boundaries within a data stream. In the resulting data stream, data values (or groups of bits) corresponding to the compressed data (as defined by the mask) will be present in the data stream. In the example presented above (FIGS. 12A and 12B), the particular tile mask had six legitimate data values to be preserved in the final data stream; Therefore, a mask pointer is generated to mark the boundary of the data corresponding to that tile. In one embodiment, the mask pointer generation logic 470 may simply be a summation of the individual values of the tile mask 452. This value is also illustrated in the example of FIG. 12A.

Reference is now made to FIG. 11, which is to be viewed in conjunction with FIGS. 9 and 10. In this regard, a compressed data stream for processing, in a graphic system, will not end with the processing of data for a single tile, but will occur many times for many tiles that comprise a graphic display. FIG. 11 illustrates four such successive tiles, each having differing mask values. The discussion of FIGS. 9 and 10, along with the example presented in conjunction with FIGS. 12A and 12B describe how a given tile mask (or pixel mask) can be used to generate a compressed data value corresponding to that tile. Successive tile masks are used to generate a compressed data stream, comprising data corresponding to the plurality of tiles. FIG. 11 illustrates how a tile mask 482 is converted into a linear mask 483 (such as the pixel mask 453 of FIG. 10). Since the mask 482 of tile i defines six legitimate data positions (or pixel positions having legitimate corresponding data values), the mask pointer generation logic 470 may generate a pointer having a value of six. As shown in the data stream 490, the portion of the data stream corresponding to tile i may have data values D0, D1, D4, D5, D7, and D8, and may then have the insertion of a pointer 492 to denote the end of tile i. Likewise, based upon the values presented in tile i+1 484, data values D2, D3, D8, D9, D10, D11, and D13 may be compressed into the data stream 490 followed by a pointer 493. Since there are seven bit positions within the mask 484 that are to be preserved (or retained through the compression), there are seven corresponding data values provided in the data stream 490. The pointer for this mask may have a value of seven, which would be added to the previous pointer value of six creating a value of thirteen. The data and pointer generation value for subsequent tiles may be generated in a similar fashion.

In addition, in one embodiment of the present invention, the data stream is passed from component to component in a graphic system through discrete-sized data packets. In one embodiment, a data packet may comprise sixteen data values. If a packet boundary falls in the middle of a tile, then a partial pointer may be inserted, as illustrated in FIG. 11. In this regard, and continuing with the description, tile i+2 486 denotes six mask positions that are to be preserved through the compression process. These correspond to data values D2, D5, D7, D8, D12, and D13. As illustrated in the data stream of 490, the data corresponding to this tile is split between packet J and packet J+1. Accordingly, a partial pointer value 495 is inserted at the end of packet J with a complete tile pointer 496 being inserted after the third data value of packet J+1.

FIG. 11 has been provided merely to illustrate one method or approach for implementing the management of data values for successive or multiple tile masks. It should be appreciated that a variety of ways in which this aspect may be implemented, consistent with the scope and spirit of the present invention. In this regard, there are various ways and mechanisms for implementing the functionality of the pointers (e.g., mechanisms for demarcating tile boundaries in the compressed data stream).

Figure 13:
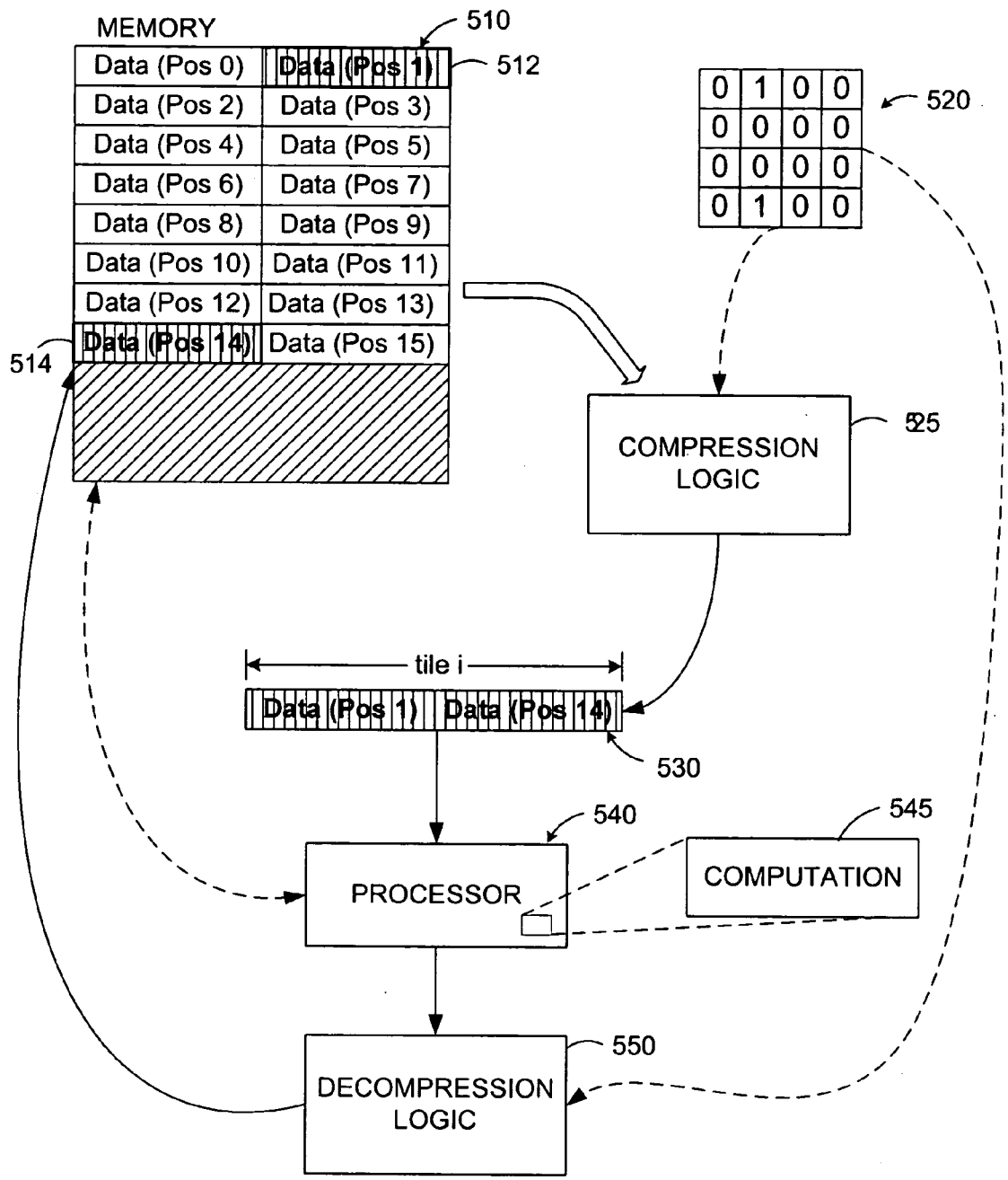
FIG. 13 is a block diagram illustrating certain components of an embodiment of the present invention, which operate to compress and decompress data.

Having described certain details regarding one embodiment for implementing certain features, reference is now made to FIG. 13, which is a block diagram illustrating features of another embodiment of the present invention. In this embodiment, a memory 510 provides storage for data that corresponds to various positions within a mask. In the context of a graphic system, each position of a pixel mask may have corresponding data that includes color information, such as RGB&A, as well as depth information, texture information (U and V), and a variety of other attributes that may be associated with pixels in a graphic system. The effect and management of this type of information is well known by persons skilled in the art, and need not be separately described herein. In this regard, it is sufficient to note that for each given pixel location, there may be a relatively large quantity of data associated with that pixel. The memory 510 of FIG. 13 illustrates sixteen discrete areas of memory, wherein each area contains multiple bytes of data, which relate to various attributes of an associated pixel. Each position of the mask 520 corresponds to an area of the memory 510 containing data.

In accordance with one embodiment of the invention, compression logic 525 utilizes contents of the mask 520 to compress data stored within the memory 510. As illustrated in FIG. 13, the mask 520 contains two positions indicating valid data for that tile. The corresponding memory areas of memory 510 have also been emphasized. Therefore, after compression by the compression logic 525, a reduced amount of data is generated as illustrated by 530. This compressed data is then provided to a processor 540 that is configured to perform one or more computations on the data 530. In this regard, computation logic 545 is illustrated as being a part of the processor 540. This computation logic 545 has been denoted generically as such, as it may encompass a wide variety of different computations, consistent with the scope and spirit of the invention. After the computation is performed, decompression logic 550 is provided to restore the data to its uncompressed form.

In this regard, it is contemplated that the computation 545 may impact only the data of memory areas 512 and 514. This data may be fed to the processor 540 for computation and restored to the appropriate memory areas by the decompression logic 550.

As previously noted, in addition to the actual data (e.g., actual contents of memory 510) being compressed, the compression logic could alternatively operate on addresses, such that the processor 540 would be configured to receive an identification of starting addresses of the memory areas 512 and 514. The processor 540 could then retrieve (directly from the memory 510) the relevant data, as appropriate, for performing the computation 545.

Figure 14:
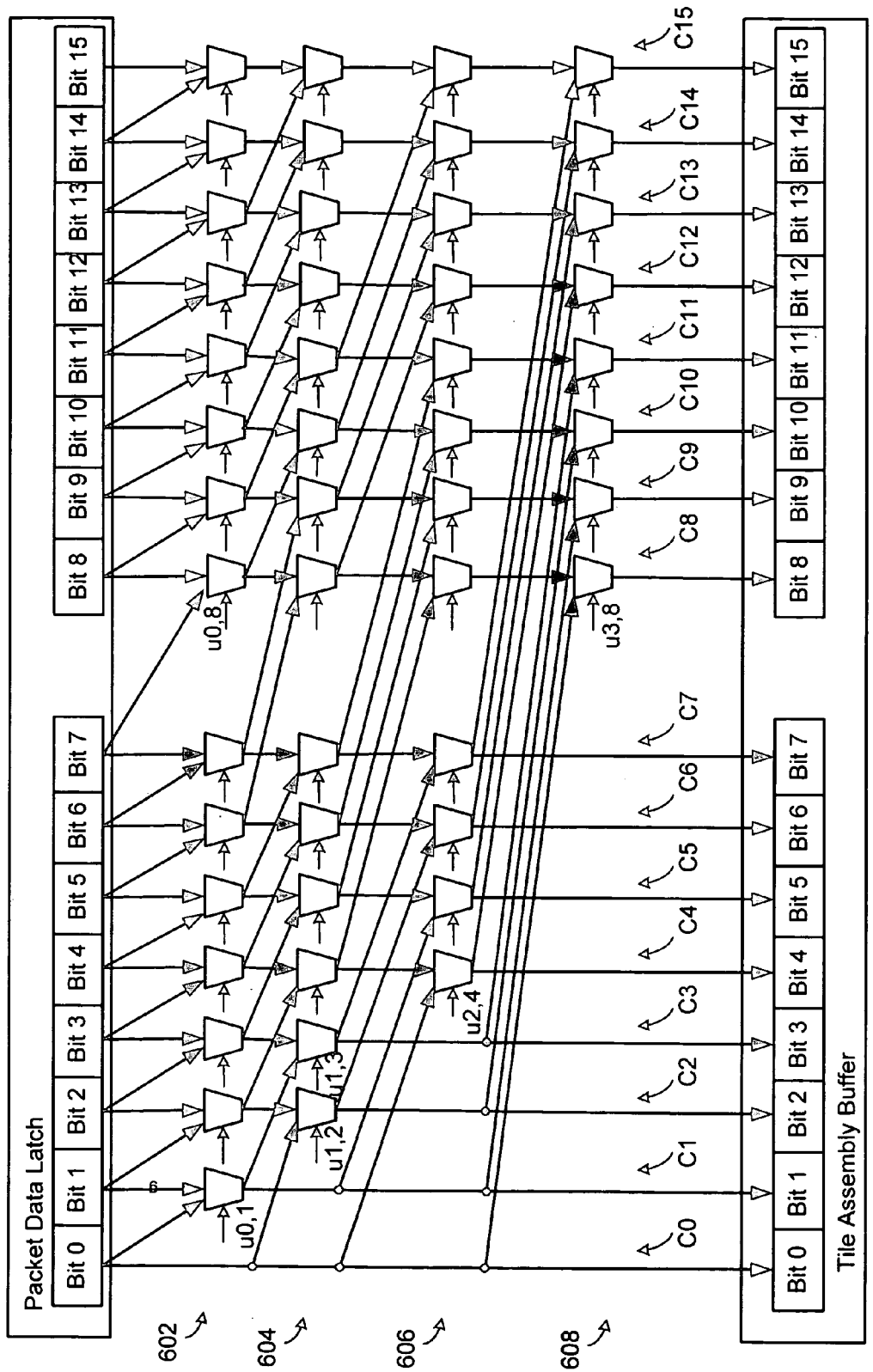
FIG. 14 is a block diagram similar to FIG. 9, but illustrating logic for performing a decompression operation, in accordance with an embodiment of the invention.

With regard to the decompression logic 550, if the compression logic 525 is structured similar to the logic illustrated in FIG. 9, then a similar reciprocal structure may be provided to perform the decompression. Such a structure is illustrated in FIG. 14. A separate detailed discussion of this figure is not deemed to be necessary, as the description of the structure and operation of FIG. 9 is sufficient to understand the operation of the structure 600 provided in FIG. 14, being that the structure performs a reciprocal operation. In this regard, the decompression logic 600 includes a plurality of multiplexers arranged in rows 602, 604, 606, and 608 and columns C0 through C15. Each multiplexer has a control input (e.g., u0,1 controls input selection of multiplexer 0,1). By controlling the values of the plurality of multiplexer control inputs, the decompression performed by the logic of FIG. 14 is controlled, in a manner similar to that of FIG. 9.

It should be appreciated that there are a variety of novel features embodied in the embodiments of this application. These include the variable-length compression of information within a component of a graphics pipeline, the architectural implementation of a packer using an array of multiplexers, wherein the control input of each multiplexer is uniquely controlled; a method of using a bit or pixel mask for controlling compression levels in a packing function, etc.

The foregoing description is not intended to be exhaustive or to limit the invention to the precise forms disclosed. Obvious modifications or variations are possible in light of the above teachings. Further, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for compressing a plurality of input signals comprising:

a plurality of multiplexers arranged in a plurality of rows, wherein multiplexers in a first row have inputs connected to signals defining bits to be compressed and multiplexers of successive rows have inputs connected to outputs of the multiplexers of the preceding row, wherein each successive row of multiplexers comprises fewer multiplexers than the previous row, wherein a first row of multiplexers is arranged so that each multiplexer in the first row has two inputs, which inputs are coupled to adjacent bit positions of the plurality of input signals, and wherein a second row of multiplexers is arranged so that each multiplexer in the second row has two inputs, in which a first of the inputs is coupled to an output of a first aligned multiplexer in the first row and a second of the inputs is coupled to an output of a second multiplexer in the first row, the second multiplexer being two multiplexers away from the first aligned multiplexer, and wherein a third row of multiplexers is arranged so that each multiplexer in the third row has two inputs, in which a first of the inputs is coupled to an output of a second aligned multiplexer in the second row and a second of the inputs is coupled to an output of a second multiplexer in the second row, the second multiplexer in the second row being four multiplexers away from the second aligned multiplexer; and control logic for controlling data select input signals for individual select inputs of the plurality of multiplexers such that individual bits of the plurality of bits are shifted varying amounts, the shift amount and the individual select inputs being determined by a mask.

2. The apparatus of claim 1, wherein the plurality of multiplexers are arranged in precisely four rows, wherein a fourth row of multiplexers is arranged so that each multiplexer in the fourth row has two inputs, in which a first of the inputs is coupled to an output of a third aligned multiplexer in the third row and a second of the inputs is coupled to an output of a second multiplexer in the third row, the second multiplexer in the second row being eight multiplexers away from the third aligned multiplexer.

3. The apparatus of claim 1, wherein the plurality of multiplexers are collectively configured to be capable of shifting individual bits of the plurality of bits by varying amounts based on the contents of the mask, wherein each additional shift value effectively causes a shifted bit to overwrite a bit that is to be unaffected by a subsequent computation.

4. The apparatus of claim 3, further comprising compression control logic, the compression control logic configured to control the control logic to shift individual bits by an amount equal to a number of bit positions, preceding the current bit position, that are to be unaffected by the computation.

5. The apparatus of claim 1, wherein the mask is a pixel mask corresponding to a tile of pixels to be displayed on a display.

6. The apparatus of claim 5, wherein contents of the pixel mask are based on depth information.

7. The apparatus of claim 1, wherein groups of the plurality of bits define data values representing an attribute for pixels to be displayed on a display.

8. The apparatus of claim 7, wherein the attribute is one selected from the group consisting R, G, B, A, U, and V.

9. The apparatus of claim 1, wherein the plurality of multiplexers are arranged in a plurality of rows, wherein multiplexers in a first row have inputs connected to plurality of signals, some of which are to be removed through compression, and multiplexers of successive rows have inputs connected to outputs of the multiplexers of the preceding row.

10. The apparatus of claim 1, wherein the control logic for controlling data select input signals for the plurality of multiplexers is responsive to a mask that defines positions of the plurality of signals as the inputs of the first row of multiplexers that are to be removed through compression, such that input signals following input signals that are to be removed are shifted into the position of the preceding signals that are to be removed.

11. The apparatus of claim 1, wherein the plurality of multiplexers are collectively configured to be capable of shifting individual signals of the plurality of input signals by varying amounts based on the contents of the mask, wherein each additional shift value effectively causes a shifted bit to overwrite a signal position that is to be removed.

12. The apparatus of claim 11, further comprising compression control logic, the compression control logic configured to control the control logic to shift individual signals by an amount equal to a number of signal positions, preceding the current signal position, that are to be removed.

13. The apparatus of claim 1, further comprising logic for compressing a plurality of groups of bits by shifting compressed groups of bits into bit positions that are to be removed during the compression, the logic being responsive to a mask, wherein contents of the mask define variable amounts that the plurality of bits are shifted during the compression, the logic further comprising a plurality of multiplexers that are individually selectable by select signal lines, such that the groups of bits are shifted by controllably selecting individual ones of the select signal lines.

14. The apparatus of claim 13, wherein the mask is a pixel mask and the groups of bits to be compressed correspond to attributes associated with pixels to be displayed.

15. The apparatus of claim 13, wherein each position of the mask defines a shift amount for a group of bits.

16. The apparatus of claim 15, wherein the content of each position of the mask is a defined by a single bit, and the shift amount for a group of bits is defined by a summation of preceding mask positions whose contents indicate corresponding pixels are not to be affected by a subsequent computation, wherein the positions of the mask are arranged in an order and the preceding mask positions are those that, as ordered, numerically precede the a given position.

17. The apparatus of claim 16, wherein the arranged order of the positions of the mask is arbitrary.

* * * * *